Feb. 14, 1967 J. D. WOLF 3,304,416
BUSINESS ORDER CONTROL SYSTEM AND APPARATUS
Original Filed May 26, 1958 8 Sheets-Sheet 1

Fig. 1

J. DAVID WOLF,
INVENTOR.

BY Homer R. Montague
ATTY.

Fig. 2

Feb. 14, 1967 J. D. WOLF 3,304,416
BUSINESS ORDER CONTROL SYSTEM AND APPARATUS
Original Filed May 26, 1958 8 Sheets-Sheet 3

J. DAVID WOLF
INVENTOR.

BY Homer R. Montague
ATTY

Feb. 14, 1967 J. D. WOLF 3,304,416
BUSINESS ORDER CONTROL SYSTEM AND APPARATUS
Original Filed May 26, 1958 8 Sheets-Sheet 5

J. DAVID WOLF
INVENTOR.

BY Homer R. Montague
ATT'Y

Fig. 10

J. DAVID WOLF
INVENTOR.

United States Patent Office 3,304,416
Patented Feb. 14, 1967

3,304,416
BUSINESS ORDER CONTROL SYSTEM
AND APPARATUS
Jesse David Wolf, Bethesda, Md., assignor to Marriott-Hot Shoppes Inc., a corporation of Delaware
Continuation of abandoned application Ser. No. 737,642, May 26, 1958. This application Mar. 7, 1966, Ser. No. 532,478
12 Claims. (Cl. 235—92)

This application is a continuation of my prior application, Serial No. 737,642, filed May 26, 1958, now abandoned.

OBJECTS OF THE INVENTION

This invention is concerned with systems and apparatus adapted to the performance of certain types of business operations, by electric signal communication and control. More especially, it is directed to the carrying out of mercantile operations in such a way as to make the fullest practical use of electrical signal or communication techniques, together with automatic control features, and thereby to expedite the performance and control of such business functions, to eliminate unnecessary labor, and to increase accuracy both in the performance and accounting phases of complex business operations.

Modern electronic technology has permitted a vast increase in the speed and accuracy with which certain more or less repetitive operations, normally forming a part of business control and accounting procedures, can be accomplished. Moreover, various proposals have been made for what is currently known as "automation," or the automatic accomplishment of manufacturing, assembly and even warehousing functions or the like. For the most part, it has been recognized that the success of such proposals depends to a great degree upon the ability to control with precision the unavoidable human factors, especially at the system input points.

Thus, in an elaborate machine accounting system, practically perfect freedom from numerical errors can be achieved, given perfect system inputs or operators. Unfortunately, the advantages of system mechanization, in terms of reduced human labor, are thus accomplished at the cost of a rather severe requirement for skilled, accurate and usually highly trained workers, albeit of a sharply reduced number. This corresponds to the general pattern of mechanization, from the advent of modern industrial technology. Moreover, the difficulty in controlling human factors has tended to limit the useful applications of mechanization to certain special fields; for example, to manufacturing establishments in which the necessary trained labor force can be maintained under stable conditions, and in such massive mechanization enterprises as large telephone systems. The latter field also exemplifies a special system design whose system inputs are so simplified that a whole population may, over a period of years, be trained to operate the equipment directly.

Somewhere between the business examples just given lies a field in which mechanization, especially in its most modern connotations of electronic signal and control, has so far largely failed. This field is the mercantile enterprise: the store, the restaurant, the hotel, and other like establishments. The necessity for translating the needs of the user or customer into the "machine language" for every single transaction has effectively limited their mechanization to conveyer devices (elevators, package distribution) and to electrical signalling such as telephony. The accounting systems employed in business, while internally of considerable sophistication, require their own special labor force as a buffer or translator between the machines and the sales force, and the extensive sales force is in turn used as a buffer or translator between the body of customers and the accounting department.

It is a principal object of my present invention to provide an electrical or electronic system in aid of general business enterprises, and especially (but not, as will appear, exclusively) of the retail store type. A system in accordance with the invention is characterized by substantially complete mechanization of the purely *control* operations of the business, as distinguished from the mechanized material-handling facilities, although the invention can in many cases readily be integrated with such handling equipment. The invention is also characterized by a sharp reduction in the requirements for operating personnel; substantially complete self-programming features make it possible to utilize a minimum number of relatively unskilled workers for serving a maximum number of customers. At the same time, my invention imposes no new requirements on the customer of the business enterprise, such as is done in the case of the cafeteria or the self-service market. This feature is a very real advantage, and while it might appear that further labor savings could be obtained by using the customer as the direct unsupervised system input, I have found that except in special cases the optimum results are obtained by the use of a limited number of intermediary employees, and directing the electronic equipment design toward increasing the effective load capacity of such personnel.

The invention also has for an object the provision of certain specialized apparatus in combination with other equipment of known design, to perform entirely novel functions, and to perform other but well-known functions in improved ways.

BRIEF SUMMARY

Briefly, my invention is accomplished by the use of customer-serving personnel as machine inputs to operate strategically located electrical control code consoles or stations which are automatically programmed to ensure proper operation, and thus to minimize the requirements for operating skill. The coded input information so generated is transmitted practically instantaneously to the same (or another) control center, and is automatically reproduced in clear text for the use of service personnel, preferably in the form of an itemized check, voucher or invoice. The reproduction will usually include the item pricing, and the use of coded signals from the control consoles or stations thus facilitates rapid changing or correction of both the items-available inventory and the item prices. At the same time, the names and quantities, or other designations, of individual items called for by the code signals are automatically routed to, and displayed at, respective supply or preparation points in accordance with the nature of each item, to constitute an instantaneous cumulative back-order listing. Means are provided at each preparation point for reducing the back-order display quantities as the items themselves are completed, ready for delivery to the customer.

Simultaneously with, and paralleling the above functions, the same signal codes are utilized for fiscal purposes including the pricing, extension, and totalizing of the customer's check or invoice, detail accounting of material sold and material inventories, and, if desired, time control records for supervisory purposes. Moreover, and especially where the installation is a local unit of a multi-unit enterprise, the coded nature of the basic signal information permits it to be relayed, as a whole or in summary form, to a higher center for inventory, supply, accounting and like supervision.

It will be noted from the foregoing that the basic order data or information codes generated by the console operator constitute the entire body of numerical (and descriptive) information required for control of the customer service aspects of the business. That is, no manual re-copying or translation of that information is needed either for checking, recording, pricing, totalizing or similar purposes. At the single entry point represented by each console, the invention provides novel self-verifying facilities so that human errors are substantially eliminated, and which facilities moreover permit supervision of the accuracy of specific employees, with a view to initiation of corrective education, the award of pay incentives for accuracy, and like measures.

While the broad principles of my invention will be understood from the foregoing, I have chosen to illustrate the same, and a preferred manner of practicing the invention, by a detailed disclosure applying such principles to the case of a restaurant of the type providing both dining room and drive-in facilities. The details of such an example will be given below, reference also being made to the accompanying drawings, in which:

FIGURE 12 is a schematic diagram of an arrangement for signalling whenever an ordered item is out-of-stock or the like.

GENERAL DESCRIPTION OF SYSTEM

Dining room

Figure 1:
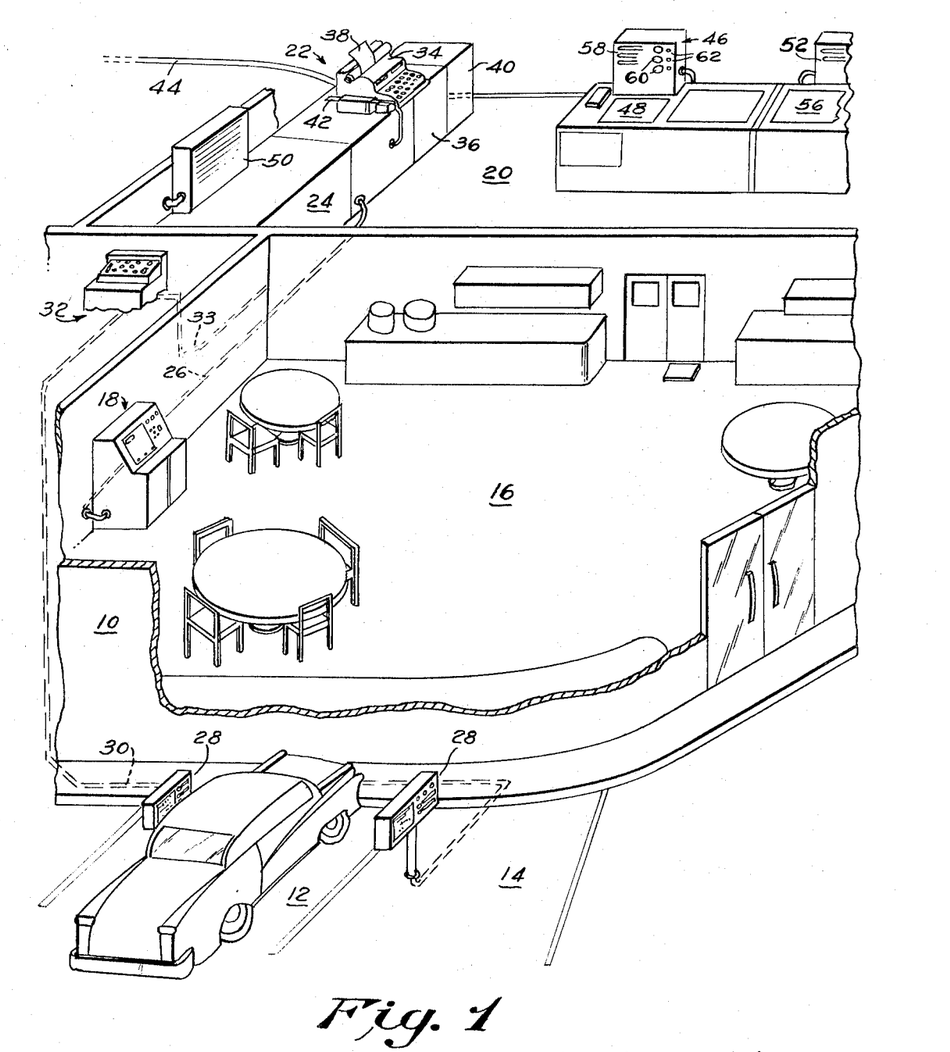
FIGURE 1 is a perspective view of a restaurant as described, partly broken away to show interior details.

Referring first to FIGURE 1 of the drawings, there is illustrated the environs of a restaurant provided with a system according to my invention. The building itself is indicated by reference numeral 10, and has associated therewith automobile drive-in stalls as at 12 and 14. A dining room is generally indicated at 16, and at one or more convenient locations therein is disposed a control console or station 18, to be described below. This console is for operation by a waitress or food server in transmitting order information to the kitchen 20 via a central control station designated 22 which will advantageously be located at or near the main order assembly point, shown as a conventional steam table 24. Cabling or wiring 26 is indicated between the console station 18 and central station 22.

Drive-in features

Preferably, although not necessarily, each drive-in stall 12, 14 has an associated control panel or console 28 located for convenient direct operation by a vehicle occupant. Consoles 28 are of a different type from the waitress console 18, for reasons which will be given below. Cabling 30 is shown connecting all of the outside consoles to a central station 32 also within the restaurant building, although by sacrificing certain advantages, a single combined central station may be used for both drive-in and dining room operations. Where separate central stations are used, as shown, the drive-in central 32 will ordinarily be connected so as to relay order information to the main central station 22, as over conductors or cabling 34. The drive-in central 32 will ordinarily also be provided with facilities for telephonic communication with the occupant of any selected vehicle.

Central control station

The central station 22 in the restaurant kitchen has associated therewith a code-controlled automatic typewriting machine 34 of a known type, having computing facilities. Associated control equipment generally designated 36 operates to channel to such common equipment the code series originated at the various control consoles. To avoid delays in handling, it is preferred to have the total code series from a given console, pertaining to one customer order, stored temporarily in equipment peculiar to each console, and from these temporary storage units successive complete orders are channeled, in rotation, to the central common equipment. Thus, during busy periods, each console in turn will be restored to its condition for the keying in of another order. It is, however, within the scope of the invention to eliminate the temporary storage for the consoles, and merely to put the central equipment in communication with each code-forming unit in turn, during which period the other consoles would not be available for the entry of order information. Automatic line-finding and "busy" signal equipment as well known in automatic telephone switching can readily be adapted to such an installation.

Check preparation

Typewriter 34 prepares an itemized list 38 of the items and quantities ordered, from a code storage device 40, which also furnishes the typewriter-computer with the unit price of each item. The list so prepared serves in a typical installation as the assembly list for the complete customer order, and also as the customer check for cashier settlement. The same information, either in code or clear text, may be recorded on a master punched tape or equivalent record 42, or items and extended prices (quantity times unit price), and totals, may be accumulated for accounting and inventory purposes. Such information may also be transmitted over wire lines 44 or otherwise, to a higher headquarters of the enterprise.

Ordered item displays

According to the invention, it is unnecessary for personnel at the assembly point (exemplified by steam table 24) to relay the items and quantity information to the various food and beverage preparation stations making up the complete kitchen. Instead, the item codes and quantity codes from console 18 are routed automatically, in accordance with the coding scheme, to the appropriate preparation stations. Thus, an order for "one luncheon steak, well done" will be represented by a code combination (from console 18) which will not only control typewriter 34, as described, via the code storage device 40, but will also directly control a back-order display 46 located for observation at the broiler station 48 of the kitchen. Similar display units (as shown at 50, 52) are located at the other preparation stations, such as the steam table station 24 and salad station 56.

Each display unit provides for a preferably illuminated display 58 of the names or suitable clear text abbreviations of all items prepared at that station, together with a bi-directional changeable quantity indicator 60 for each item designation. The quantity indicator is controlled automatically by the received item and quantity codes to maintain an accurate cumulative back-order indication. Means such as a manual button 62 for each item enables the chef at the preparation station to reverse the quantity display indicator for that item, step-by-step, as such items become completely prepared and ready for delivery. It is thus unnecessary for the chef to burden his mind with complicated quantities and varieties of ordered items, and the legible display encourages accuracy in his operations.

Operational procedures

The controller, manager or other supervisory operator at the steam table 24 will receive an even flow of prepared food and beverage items, approximately synchronized with the checks or lists 38 prepared by typewriter 34, with allowance for the item preparation times. Missed and duplicate items will be practically non-existent because all operations are under direct control of the order console 18. Transport of prepared items in the kitchen, for assembly, and thence to the customer in the dining room, will preferably be accomplished in the usual way of restaurant operation.

It is contemplated that the customer himself will prepare a handwritten memo of his complete order for the waitress, who will take it to a console 18 for transmittal by push-key operation as described below. However, it will be seen that optional procedures in this respect can perfectly well be utilized. So far as the inventive novelty is concerned, the customer might well operate a console directly, or the waitress might operate a suitably located console from oral instructions of the customer. The complete automatization of pricing, extension and totalizing functions eliminates a source of numerous instances of customer (and employee) dissatisfaction.

Provisions for cancelling or correcting order information at the console, and for immediate indication to the waitress of any shortage of menu items, will be described below.

For the application selected for detailed disclosure herein, by way of example, complete human control of the system can be achieved by signals composed of no more than four decimal digits. From the standpoint of the human operator such as a waitress, for example, the information which has to be transmitted to the equipment is (a) a waitress number or designation, ordinarily requiring only two decimal digits, such as "Waitress No. 28," followed by the designation code for a food item requiring, for any one menu, no more than three decimal digits, such as "luncheon steak rare, 285," in turn followed by a quantity designation, such as "3." It is convenient, since there will be a quantity designation for each food item, to represent these two items by a single four-digit code (2853) which will be handled as a single signal, the equipment being arranged to distinguish between the item code portion and the quantity designating portion. The equipment can also, in this example, readily be arranged to recognize the three-digit initial code, as such, to be the waitress number; and to avoid confusion and complications, the rule may be adopted that non-significant zeros are to be inserted by the operator ahead of any information itself using less than four digits. Thus, the code for Waitress No. 28 would be transmitted as "028," and the code for 2 servings of a food item number 56 would be keyed into the control console 18 by the digits "0562."

It will be appreciated that mere expansion of the above scheme to use additional digits will readily provide for businesses in which item numbers and quantities are such that different numbers of digits are required to provide an unique code for each transaction. Moreover, in stating above that three digits are sufficient to select any desired item number from a menu, it is not intended to imply that a restaurant cannot serve more than 999 different food items. On a year-to-year basis, the number of items served can greatly exceed this number, but by the use of readily changeable code translating devices, to be described below, only the codes for the total number of items to be served on any one day, or at one meal, need to be selectable during a given period. This provision also makes it possible to associate the current selling price for each item in the code translating equipment, greatly facilitating the fast and automatic pricing of the order.

Order console

Figure 3:
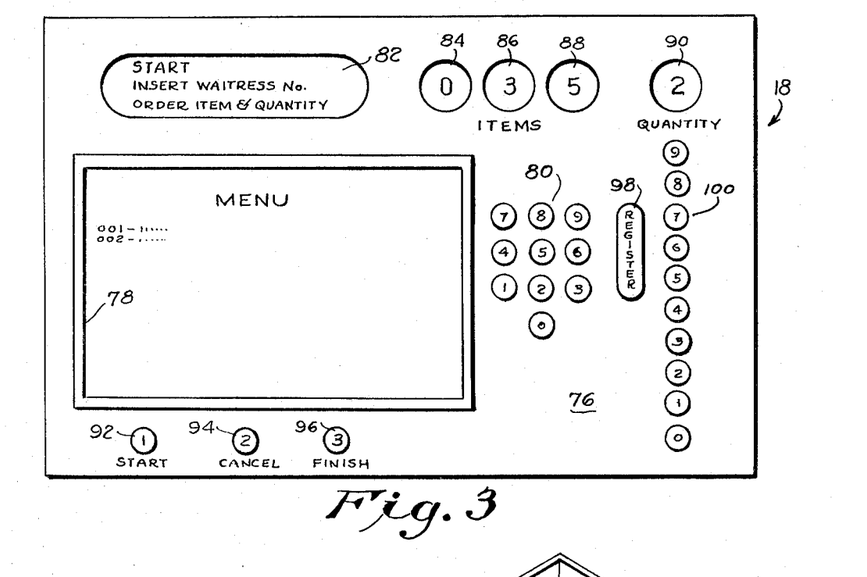
FIGURE 3 is a view of the panel of a typical control console station.

The control console 18 is shown in detail in FIGURE 3 as having a panel 76 provided with means such as a frame 78 for releasably retaining and displaying the current menu, listing the food items offered and the code number of each item. A set of ten keys 80 is provided, marked with the numerals 0 through 9 respectively, to enable the user to set up the desired numerical codes in the same manner as operating a 10-key adding machine. The panel also carries an instruction display 82 which may take the form of a screen bearing instruction legends such as "Start," "Insert Waitress Number," "Order Item and Quantity" and the like, with lamps to enable the automatic programming control to cause the selective display of these legends at appropriate times. A set of decimal digit indicators 84, 86, 88, 90, which are thus four in number in the chosen example, is provided for indicating to the waitress the code which she has set up on the numerical keys, so that she can see the actual registration before it is finally transmitted to the central control equipment; actual transmission of the set-up registration is accomplished only when the waitress operates a key or button marked "Register," which key is suitably located on the same panel. Finally, the control console panel will carry special purpose function keys or buttons including, in this example, a key 92 marked "Start" which puts the console under control of its programmer and brings to view the "Insert Waitress Number" instruction, a key 94 which enables the waitress to clear or cancel out a registration which was shown to be erroneous by the digit indicators, and a key 96 which can be operated to signify that all of the item codes and quantities have been registered and hence that the particular order is now completely transmitted. Operation of this last ("Finish") key 96 will automatically cause the typewriter-calculator combination to total the check, and to advance the typewriter carriage to position a new blank form in position for the next ordering operation. During the ordering operation, the depression of the "Register" key 98 after each four-digit code designating an item plus a quantity will cause the typewriter-calculator to type out the item code, then type out the clear text abbreviation for the food item (from information automatically withdrawn from the translator storage), tabulate to a new column and insert (also from the translator storage) the unit price of that item, and finally tabulate again and type out the extended total for the specified quantity of that item.

It will be recalled that in addition to the above described 10-key set 80, FIGURE 3 shows a separate set of ten keys 100, this group being in a column marked "Quantity," whereas a single set of ten keys such as at 80 should suffice for entering all four digits comprising the code for a food item and the quantity desired. Actually, the keys 100 are provided merely to segregate the item code from the quantity, in the mind of the operator, and keys 100 are thus merely electrically multiplied to the same contacts as are operated by the keys 80. After a little experience, the user will learn that the quantity digit can just as easily be inserted merely by the appropriate key in set 80, rather than in set 100, and the purpose for keys 100 will then be eliminated.

Order console controls

Figure 2:
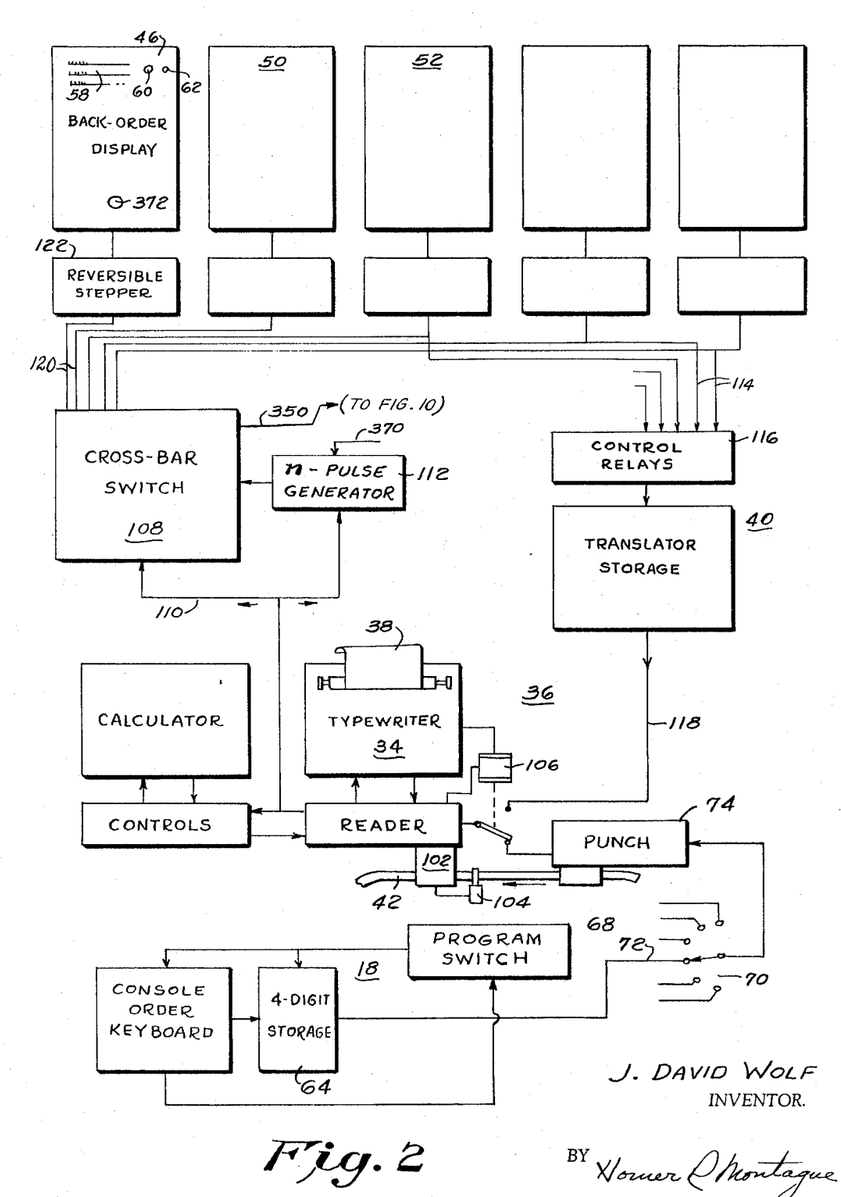
FIGURE 2 is a schematic block diagram representing the major equipment components of a system for the restaurant of FIGURE 1, and also the flow of signal and control information therein.

The user of console 18 will normally find it initially in operating condition, with the legend "Start" displayed in panel 82. The user will then press button 92, which will operate the program switch 68 (a rotary stepping switch) to change the legend, and at the same time there may be applied over channel 72 the code combination indicating that a completely new order is now arriving from this console. The appropriate code will thus be punched into tape 42. At the same time, the program switch 68 causes the display "Start" to be extinguished, and brings to view (as by illuminating a different lamp) the instruction "Insert Waitress Number" at 82. The waitress then inserts her number in keys 80; the number will be a three-digit number, such as "028," and these three digits will be stored in the temporary storage 64 as above described, and at the same time the relays (or stepping switches) of the storage register 64 will cause the indicators 84, 86 and 88 to be correspondingly altered. The indicators may for example be "Nixie" tubes as manufactured by the Burroughs Corporation, of Philadelphia, Pa., namley ten-anode gas tubes with each anode shaped to represent a decimal digit, or they may be simple mechanical counters electrically positioned, or equivalent devices. When the user has inserted the three digits, and checked their correctness as displayed, she depresses the Register key 98, which discharges the registered code over channel 72 and simultaneously advances the program switch 68 to remove the legend "Insert Waitress Number" and to bring up the legend "Order Item and Quantity." The operator then proceeds to insert the proper four-digit code in the keyboard, for the first item of food and its quantity, checks the registration as now displayed at 84–90 (these having been cleared when the storage 68 was emptied), and again operates key 98.

If, on the inspection of the displays 84–90 the operator notes that a wrong code has been registered, she merely depresses button 94, and the storage 64 is immediately cleared, but without transmitting the erroneous code to the channel 72. This can readily be done by wiring button 94 to duplicate the operation of the register button 98, but simultaneously to interrupt the read-out potential of register 64. The proper code can then be correctly inserted. When all of the food items have been ordered, the operator will depress "Finish" button or key 96, which will transmit the code designating the termination of that order, for punching into tape 42, and will restore the program switch 68 to its initial condition, with the "Start" legend displayed at 82, also clearing the indicators 84–90 to zero.

*Check typing and calculating*

The foregoing operations have caused punch 74 to insert the codes, as described above, into the master tape or record 42. The selector switch 70 is indicated as of the rotary type operated to put into control any one of several consoles, where several such are used in the system. Thus, switch 70 is shown as connecting the tape punch 74 to line 72, but upon rotation to another angular position, the switch 70 can connect to similar lines from other consoles, not shown in FIGURE 2. The switch 70 can readily be made to operate automatically to connect itself to any console whose "Start" button has been pressed, and until it has so connected itself, the "Start" legend or signal will not appear at that console. The circuit arrangement will be obvious to those familiar with the line-finding operation of automatic telephone systems. Once connected to a particular console, switch 70 cannot be seized by any other console until the user of the connected console has pressed his "Finish" key, to effect totaling of the order which he has been transmitting.

Alternatively, if sufficient code storage is provided for each and every console, this line-finding arrangement can be eliminated. Several operators or waitresses can insert complete orders into their respective consoles and hence into their respective storage devices, and these can thereafter be read, in turn, into the remainder of the system as it will be described below. Such individual storage units may themselves consist of a tape punch and tape reader arranged in cascade, the reader output signals being directed to master punch 74 in an orderly sequence.

The process has now been followed to the point where master tape 42 contains a complete set of codes corresponding to one order. This tape passes immediately to the tape reading head 102 of the typewriter 34, a loop control switch 104 controlling reader 102 so that the latter will not feed tape unless an adequate length of tape lies between the punch and reader. Punch 74 is internally arranged to feed a sufficient length of blank tape immediately following the completion of each order.

The mechanisms of the typewriter itself, and of the combination of the typewriter and the calculator, form no part of the present invention, but are commercially available items supplied under the trademark "Computyper" by the Friden Calculating Machine Co., Inc., of San Leandro, California. A typical tape-controlled typewriting machine forming the basis of such equipment is well illustrated in U.S. Patent No. 2,700,446, Blodgett, and a typical calculating auxiliary for such a machine is illustrated in U.S. Patent No. 2,728,521, Benson et al. Briefly, the combination provides a tape-controlled typewriter in which the numeral keys are linked to switches which control, via electric circuits, the registers of a calculating machine; the typewriter carriage is also provided with contacts or switches so arranged that, in making tabular lists, the registration of the quantity of an item may be accomplished in one register, the registration of the unit price in another register (selected by a switch operated when the typewriter carriage is tabulated to the proper column), and the computed extension (quantity times unit price) is calculated when the carriage is tabulated to still a further column position. The calculator then actuates the numeral (and, when desired, the period or decimal point) keys of the typewriter, to print in the last column the extended total. The calculator also registers this total in a register which accumulates the extended totals of succeeding lines. Finally, upon operation of a total taking key of the typewriter, the registration of the grant total is caused to print in a suitable position on the paper or check.

In addition, such a typewriter-calculator combination permits straight text matter to be inserted in the form or check, either by manual operation of its letter keys and function keys, or the same keyboard can be controlled from a properly prepared tape as well described in the Blodgett patent. It will obviously be very convenient, and lead to considerable simplification, if the particular codes generated by the operation of the console keys are compatible with the code employed by the combined typewriter and calculator. That is, it would be desirable that the code produced when the operator presses numeral key "3" on the console, be the code which, when passed through the reading head of the Computyper, will result in the actuation of the keylever which prints a "3" on the customer check. However, the invention is not limited to such a system, because suitable code converters for changing registrations in one code, time-serial or time-parallel, into registration in an entirely different code, are well known in the art and can be availed of to render the suggested limitation unnecessary.

In order that the typewriter 34 shall be able to print, not only the item numbers as digits, but also the clear text name or abbreviation for the item, and its unit price, it is necessary to provide what has been referred to herein as the code translator storage device 40. This device may also take various forms, within the confines of the invention, but may most easily be thought of as a prepared paper code tape having, spaced along its length, the typewriter codes for the names or abbreviations of all of the food and beverage items to be handled during one meal, one day, or any other suitable interval, together with codes constituting the "address" of each such group of typewriter codes. The group for each item will be followed by a group of codes designating the unit price of that item. Obviously, where a considerable number of items are handled every day, and others only on occasion, two or more such tapes may be used, making it necessary to change only one tape to suit the day, week or other interval. The address code for each item may well be identical with the item number code as transmited from the console 18. In any event, matters are arranged so that, when an item number code reaches reader 102, the typewriter 34 types that number and stops momentarily in response to the fact that three numerals have been typed. The relay 106 (FIGURE 2) then operates, to disconnect the reading contacts of reader 102 from the tape-sensing pins as described in the Blodgett patent, and to connect the reading contacts to the storage device 40. In the meantime, however, the coded item-number impulses or circuit selections which have just been typed have also been applied to the cross-bar switch 108 over channel 110, and the latter switch has operated, in a well-known way, to establish a path through its output channel 120, to the control relays 116 of storage device 40. The pre-prepared tape in device 40 is thus caused to advance, through a high-speed reading head, until the code group position identified by the item-code is in position for read-out, whereupon the item name or abbreviation codes are immediately supplied over channel 118 to the reader 102 of typewriter 34, which thus types the selected item name.

Read-out storage device 40 then stops momentarily, the last code read out being a "tabulate" code to cause the typewriter carriage to advance to a new column for insertion of the desired quantity of the item just typed. The act of tabulation causes reader 102 to advance one step, and to read the "quantity" code from tape 42. The carriage is then caused to tabulate again automatically, into the column for "unit price," and the relay 106 operates again to feed into typewriter 34 the codes, in storage device 40, representing the current unit price of the item. The typewriter carriage then automatically tabulates into the total column, and the calculator inserts the multiplied extension, after which the typewriter is caused to return its carriage and execute a line feed. Relay 106 is released, and the tape 42 progresses through the reader 102 to read the next item code.

It will be recalled that in addition to the above functions, the apparatus includes a plurality of back-order display units, located at the work stations. These are indicated in FIGURE 2 at 46, 50 and 52. Since the names of the items selectable at that station will appear as at 58 (in a column vertically) in clear text, it is sufficient, to indicate that one or more of an item has been ordered, to actuate the quantity display indicator 60 opposite that item. For simplicity of description, these indicators are also disclosed (in FIGURE 2) as "Nixie" tubes, though they can be of any desired construction which can be operated to count up and down in response to code pulses or connections. A special form of connector, designated a reversible stepper, is indicated at 122 as receiving the information over channel 120 as to the item selected, and completes a circuit to the appropriate quantity indicator 60. When the quantity code arrives from reader 102, the pulse generator 112 causes the selected quantity indicator 60 to change, by sending over line 120 a number of pulses equal to the quantity code, thus adding a newly ordered quantity to its previous display. If the indicator previously showed zero, the newly displayed numeral would equal the total quantity now on back-order. As the ordered items are completed by the worker, he operates reverse-stepping buttons 62 beside those item names on his display board, to subtract from the total back-order the quantity no longer needed to be prepared.

*Circuitry of the control console*

Figure 4:
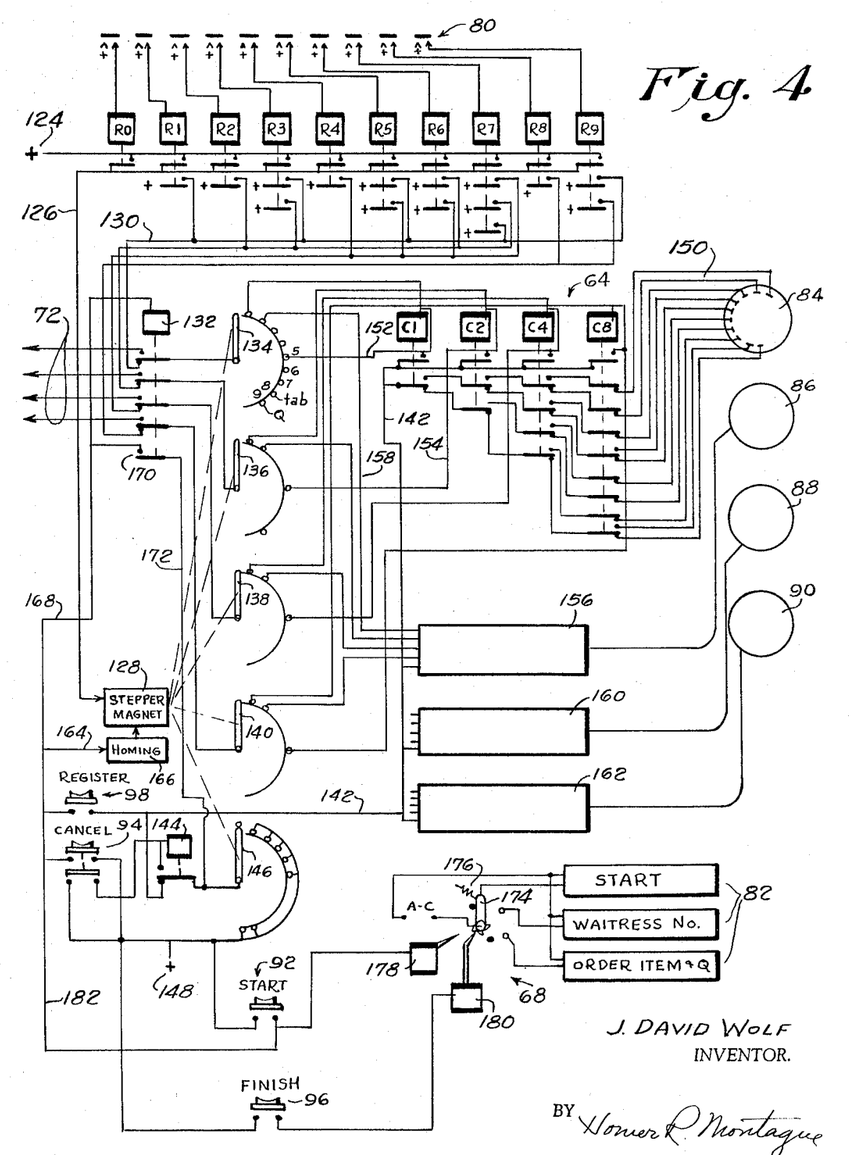
FIGURE 4 is a schematic and typical wiring diagram of the console of FIGURE 3.

FIGURE 4 of the drawings shows in detail the circuitry and equipment required for a preferred and typical form of control console 18. Where applicable, the same reference numbers have been employed as in the previous figures, with such additional numerals as are required. Thus, numeral 80 designates the operator keys, which as stated above may have connected in multiple therewith the "Quantity" keys 100 of FIGURE 3. In order to use a simple and fast-acting manual key, these are shown as each of the form making only a single circuit, by completing a circuit from a common voltage supply indicated by the plus sign throughout FIGURE 4. Operation of any key 80 in turn operates a corresponding one of the relays R0, R1 . . . R9, and hence applies voltage from positive source terminal 124 over lead 126 to the stepper magnet 128 of a rotary switch shown as having at least five contact levels with a number of bank contacts on each level. Upon operation of the key 80 and its corresponding relay, the stepper magnet 128 rotates all of the bank wipers one step. Relays R0–R9 also have contacts providing, over leads 130, the binary coded decimal equivalent of the selected digit, and these leads are connected, through four back contacts of a relay 132, to the wipers 134, 136, 138 and 140 of the rotary switch. As each wiper is now in contact with the first of its bank contacts away from the "home" position, positive potential from the contacts of the operated relay R0–R9 is applied over selected wipers to the coils of one or more of relays C1, C2, C4 and C8. It may be mentioned here in passing that the return paths of all of the described circuits are completed to the negative terminal of the potential source in the conventional way of electric control circuits.

Thus, if the key operated energized relay R7, potential would be applied to wipers 134, 136 and 138, operating relays C1, C2 and C4. The first "make" contact of each of the latter relays completes a holding circuit over common lead 142 and the "break" contact of relay 144 to a wiper 146 of the rotary switch, all of whose contacts, except the "home" contact, are connected to the common positive potential terminal 148. Thus the selected relays C1, C2 and so on remain energized. Also, their remaining contacts provide the necessary conductor selections, in the well-known manner of binary coded decimal digit storage in relays, to connect positive potential over leads 150 to a single digit-displaying electrode of the Nixie tube 84. Finally, the completion of the holding circuit for each selected relay C1–C8, over lead 142, has also placed positive potential on the fifth bank contact of each level of the rotary switch. Thus, if relay C1 was selected, this potential is applied to the fifth contact of the bank served by wiper 134, over lead 152. A similar lead 154 is shown from the holding circuit of relay C2 to the fifth contact of the level served by wiper 136; the remaining connections are shown but need not be described.

Relays C1, C2 and so on thus constitute a register for a single decimal digit; namely the one selected by the first key of set 80 to be operated. Operation of a different (or the same) key will now advance the wipers 134 through 140 to the second rotary step of the switch, and relays R0–R9 will store the second decimal digit in a duplicate set of register relays, indicated merely by the block 156. The inputs to these registers are indicated as at a conductor 158 from the second contact touched by wiper 134, and similar conductors for the other wipers. Further digit registers are indicated at 160 and 162 for registering the last two digits of the keyboard operation. All of the register relays are held operated over the same holding lead 142. In addition, just as the read-out conductors 152, 154 of relays C1–C8 are connected to the fifth contact at each of the levels served by wipers 134–140, the read-out conductors from registers 156, 160 and 162 are connected to the sixth, seventh and ninth contacts of their corresponding switch levels. When four digits have been selected by keyboard 80, and the display of these four digits has been inspected at indicators 84–90, the operator presses the "Register" key 98.

When the register key 98 is depressed (closed), positive voltage from point 148 is applied over wiper 146 and the back contact of relay 144 through the contacts of 98, and thence over lead 164 to the homing circuit 166 of the stepper switch, which then rotates its wipers steadily until they reach their home positions. However, during this homing operation, relay 132 is operated over lead 168, and the four "output channel" leads 72 are connected to the wipers. In passing over the fifth bank contact of the wiper 134, the wiper will momentarily be connected to positive voltage if relay C1 had been held energized; the circuit is traced from lead 142, through the first or hold contact of relay C1 (if operated) and lead 152 to the fifth contact on the bank for wiper 134. Similarly, if any other of relays C1 through C8 was held operated, positive potential would also be found on the fifth contact of the corresponding wipers 136–140. In short, in stepping over the fifth bank contact, the wipers will read out, to leads 72, the same decimal digit which was stored in the four-relay register. As the wipers pass over the sixth and seventh bank contacts, the registers 156 and 160 are similarly read out to leads 72. As the wipers step to the eighth contact at each level, the code for a tabulate operation of the typewriter 34 is transmitted. This may either be transmitted over leads 72 as a special combination of potentials on the eighth contact at certain of wiper levels 134–140 (bearing in mind that four conductors will designate up to 16 decimal numerals, or several more than are needed for the register operation), or this eighth contact may operate a separate relay to transmit the tabulate code over an additional conductor.

As the wipers pass over the ninth bank contact at each level, the code stored in register 162 is read out to leads 72, corresponding to the registered quantity of the item designated by the code stored in the registers previously read out. The tenth read-out step may be a second tabulate code to cause the typewriter to advance its carriage into the extended price column of the customer's check as above described, although this tabulate operation can equally well be caused to result from internal controls of the typewriter-calculator equipment. In any event, the homing circuit 166 retains control of the stepper switch until its wipers have advanced to their home positions, at which time wiper 146 leaves the bridged bank contacts of this level which have theretofore furnished positive potential to wiper 146 and key 98. Since lead 142 received its positive potential from this same wiper 146, all of the holding circuits for relays C1–C8 and for the relays of registers 156, 160 and 162 are now also opened, and the registers are restored to cleared condition. The indicators 84–90 are also cleared, either to give no indication whatever, or preferably to indicate a "zero." It will have been noted that when operation of key 98 caused relay 132 to operate for read-out purposes, the relay remained operated over its holding contacts 170 which are parallel to the contacts of key 98 by leads 168 and 172; this ensures completion of the homing and read-out operations even though key 98 may be released prior to their completion. However, when the stepping switch arrives at its home position, this holding circuit is also opened by reason of wiper 146 moving to its home contact.

Succeeding items and quantities of each are entered on the keyboard 80 in the same manner, and after each is ordered, the register key or button 98 is operated to read out the stored code combination, as described. If at any time during the keyboard operation, or after inspection of the digit displays 84–90, the operator wishes to cancel an entry before it is transmitted out of the console, he operates the "Cancel" button 94. The latter has two sets of contacts, one set paralleling the contacts of the register key 98, and another set connected between source 148 and the coil of relay 144, which therefore operates. The circuit from source 148 through wiper 146 is thus opened at the contacts of relay 144 and is no longer extended over the holding circuit 142 for the register relays C1–C8 and registers 156–162, and these are cleared, as are the displays 84–90. Relay 144 is held operated by its make contact even though the cancel button be released immediately, until wiper 146 returns to its home position, which it will accomplish since the homing circuit 166 is energized over lead 172, contact 170 of relay 132, and leads 168, 164. Since the relays C1–C8 and the other registers have been cleared, there are no code potentials on any of the read-out contacts of the various levels of the rotary switch.

*Automatic programming of console*

The self-programming feature of the console is readily accomplished by a simple spring-returned stepping switch of the type known as a minor switch, which need have only one level, with three contact positions. Such a switch is indicated in FIGURE 4 by numeral 68, and comprises a wiper 174 normally urged against a stop pin by a spring 176, but movable clockwise by a ratchet magnet 178, a step at a time, passing onto successive bank contacts as shown. Return to normal is accomplished by energizing a release magnet 180, which allows the spring to restore the wiper to its home position. Each bank contact energizes, as from an A.C. source, one of the illuminable legends 82 in turn. Thus, at the commencement of each use of the console 18, wiper 174 will be in its home position and will energize the legend "Start." When the operator depresses the start button 92, magnet 178 steps the wiper onto the next bank contact, energizing the legend "Insert Waitress Number" and extinguishing "Start." After the operator keys the waitress number into keyboard 80 and operates the register button 98, the latter, over conductor 182, again actuates magnet 178, extinguishing the "Waitress" legend and lighting up "Order Item and Quantity." Moreover, after each successive operation of the register button 98, wiper 174 will be moved in the direction past the last bank contact, but its ratchet prevents it from locking in such position, so it returns to the position where the "Order" legend is illuminated. Accordingly, the "Order" legend is displayed at all times when the console is ready to accept a new item order. When the "Finish" button 96 is operated, it energizes the release magnet 180, restoring the switch 68 to its home position and re-illuminating the "Start" legend in preparation for the next order to be transmitted. Where only one console at a time is permitted access to the master punch 74, the program switch may additionally be wired to prevent the "Start" indication until a channel is available, in a manner similar to the line finding and busy operation of a telephone system.

*Translator storage equipment*

Figure 5:
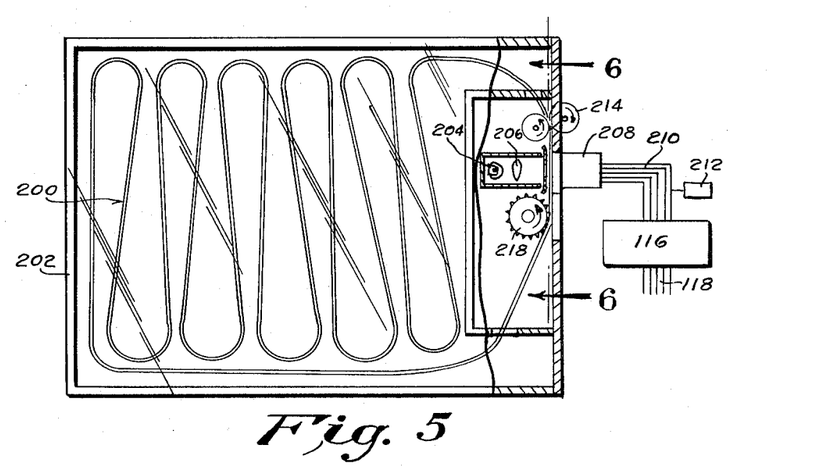
FIGURE 5 is a view in elevation of a preferred form of translator code storage equipment.
Figures 6, 7:
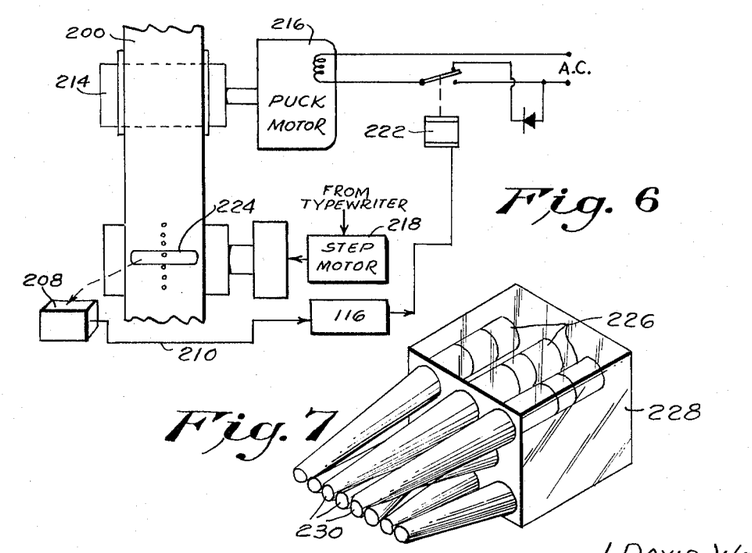
FIGURE 6 is a schematic of the motor controls for the translator.
FIGURE 7 is a perspective view of one form of tape reading head.

FIGURES 5, 6 and 7 illustrate schematically the details of a preferred form of translator storage equipment, such as is represented broadly in FIGURE 2 by numeral 40. It is desirable that the storage device be such that the typewriter codes for a large number, say 200 or more, names of food items, and their unit prices, be available very quickly, so as not to delay the order console between items. At the same time, it is desirable that the translator code storage be readily changed when necessary to bring it up to date, as items and prices will vary. Moreover, it is desirable that the entire storage memory be quickly replaceable, so that the entire menu may be changed, either from meal to meal or from day to day, or at other intervals. In multi-store operations, it is contemplated that the stored material may be furnished from time to time from a central headquarters, so that the local personnel need only insert a new storage unit as a whole, in order to keep their equipment fully current. For these reasons, it is preferred to construct the translator storage in the form of an endless paper code tape, of the same type as used in the typewriter 34 and described in the Blodgett patent. With rows of code holes spaced $\frac{1}{10}$ inch apart on the tape, the names and prices of 200 items can readily be accommodated on fifty feet of the tape, together with the item codes which will serve as address control elements for the storage device. By reading the tape for the item codes at high speed, the correct address can easily be located in a half second, upon which the desired stored codes will be read out at the relatively slower, intermittent rate which is appropriate to the speed of the typewriter 34.

In FIGURES 5 and 6, numeral 200 designates a fifty foot length of paper code tape, with its ends cemented to form an endless loop, and bearing the desired item codes, item name codes, and unit prices as successive rows of code holes. This tape is housed in serpentine fashion in a shallow box-like container 202, and is threaded through the reading head assembly comprising light source 204, lens system 206 and photoelectric multi-channel reader 208. The output of the latter, as multi-channel conductors, is indicated at 210, and the apparatus controlling the search cycle is designated 212. The tape 200 is moved at high speed through the reader head as by a friction drive puck or rollers 214, driven by a motor 216. During the high speed drive portion of the cycle required to find a specified item coding, only the item code itself need be sensed, and it may thus very well be entered in code hole rows reserved for that purpose, as these will be spaced perhaps three or four inches apart on the tape. When the desired item code is found passing through the reader 208, motor 216 is instantly braked (as by applying direct current to a winding of an A.C. motor), and if necessary reversed to bring the first code of the item name into reading position. Arrangements for such automatic positioning of code tapes are well known.

With the proper item name code in position, a step drive for the tape is brought into action, the same being designated by numeral 218, and operating just as described for the tape reader of the Blodgett patent. However, in this instance, the tape may actually be sensed by the photoelectric head 208. The latter repeats the sensed codes over conductors 210 and contact paths through the control relays at 116, to the typewriter 34, these conductors corresponding to the channel 118 in FIGURE 2. As already described, at the end of the item name codes, a tabulate code may be provided to operate the typewriter carriage for proper column positioning, or the tabulate code may be supplied direct from the rotary switch as described in connection with FIGURE 4. The specification as to which item is next to be read from tape 200 is of course provided by the conductors 114 of FIGURE 2, the cross-bar switch 108 functioning to energize an unique conductor for this purpose, and setting up a combination of relays in control 116 to stop the tape when a particular code reaches reader head 208. Alternatively, the cross-bar switch may merely designate the numerical position of the desired item name code with reference to the length of tape 200, in which case a simple counting operation will stop the tape drive when the desired item name code is in reading position. These variants, and others, will be readily understood by those skilled in the art.

The drive arrangements for the tape are best shown schematically in FIGURE 6, in which motor 216 is shown as normally energized from an A.C. line, numbered 220, but which can be disconnected from this source, and quickly braked, when relay 222 is de-energized to connect the motor to a direct current supply here shown as obtained from the A.C. line by rectification at 224. The relay 222 is controlled from control relays 116 connected to head 208, here shown as reading the tape codes in a transverse row 224 of the tape 200. When the desired code group has been located, the impulses for the stepping of reader tape drive 218 are preferably obtained from the typewriter 34, as indicated.

FIGURE 7 represents one practical form of photoelectric tape reader. A set of eight (for eight-channel code tape) photoelectric cells, for example of the cadmium sulfide type, designated by 226, are encapsulated as in a block 228 of suitable plastic such as Lucite (methyl methacrylate polymer) or the like, the block providing integral light-conducting conical protrusions 230 extending from one face, and angled so that their light-receiving tips are disposed in a single row, as shown. Such an assembly provides a code reader with extremely fast response, and with sufficient output to operate a transistor or like amplifier of very simple construction. Using such a reader and adequate motor drive and braking equipment, it has been found practical to search the entire length of tape 200 in one second, providing an average access time of one-half second. The entire tape can easily be changed or replaced, and will last indefinitely.

*Alternate translator storage*

Figure 8:
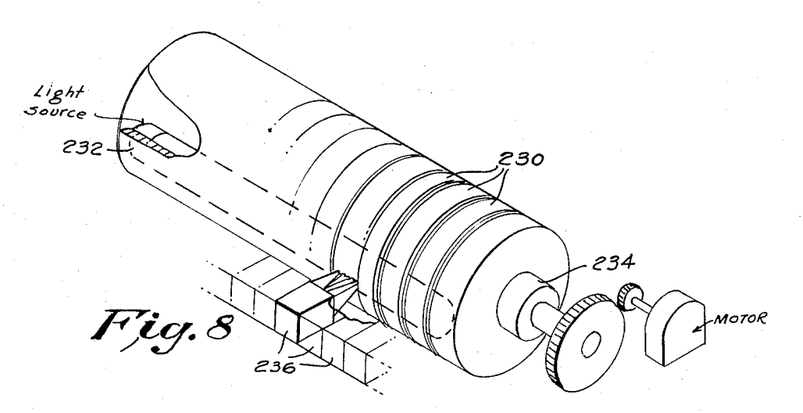
FIGURE 8 is a schematic view of a modified form of translator storage equipment.

Even faster access speed, though at the cost of requiring a plurality of reader heads (instead of the single head of FIGURE 5) is a drum form of code storage illustrated in FIGURE 8. In this figure, short lengths of tape 230 are cemented as endless loops in side-by-side relation along the length of a transparent drum or cylinder 232, journalled for rotation as by bearings 234. Each short tape loop has associated therewith an individual reader head 236 such as illustrated in FIGURE 7, or of other type including spring-contact fingers, as will be obvious to those skilled in the art of tape reading. If a single item name code (and price code) is provided on each tape loop, then the address selection is achieved merely by energizing a selected single read head. Alternatively, there may be several code groups on each tape, in which case the address is specified by a combination of the energization of a single reader head, and the rotational position of the drum. Several drums may be geared together for concomitant rotation, to provide an adequate number of code groups in the storage. When the selected code has been located at its reader head, the drum or drums may then be stepped, under timed control or by impulses from typewriter 34, to cause the code group to be read out to the typewriter 34.

*Selector switch for back-order displays*

It has been stated earlier that cross-bar switch 108 (of FIGURE 2) operates to select or mark a particular conductor 120 for each item ordered, in turn, to control the quantity display indicators at the work stations. A suitable and novel form of apparatus for effecting these displays is illustrated schematically in FIGURE 9 of the drawings. Briefly, it may consist of a rigid framework or base 300 having fixed top and bottom plates 302, 304 and a vertically sliding carriage 306, suitably guided as by bars 308 supported in the top and bottom plates. The carriage is driven up and down by a lead screw 310 driven from a motor 312 brought into operation by a suitable relay whenever a line conductor terminating at this device becomes energized. These terminating lines also are connected individually to a bank of vertically-spaced contact segments 314 mounted or printed on an insulating bar support 316 paralleling the carriage travel. A wiper contact 320 on the carriage engages the segments 314 in turn, and the completion of a circuit to a segment connected to an energized incoming line (120) operates the motor relay to stop the motor, thus defining the vertical position of carriage 306. A second wiper 321, also mounted on the carriage, is positioned so as to wipe along a second series of contact segments 323 carried by the insulating bar 316. Each wiper has a conductor lead which is flexible, so as not to interfere with the carriage travel, and these leads are designated 348 and 349.

Figure 9:
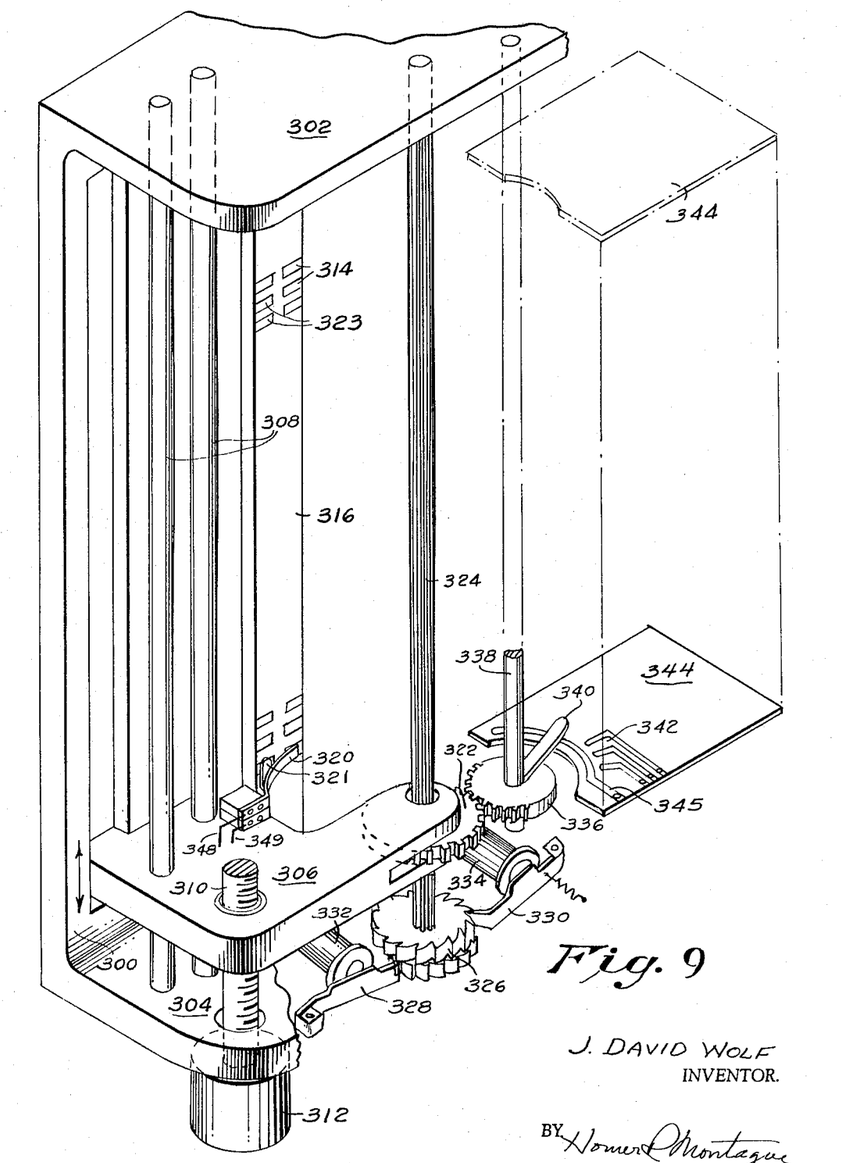
FIGURE 9 is a perspective view, partly broken away, of a novel form of bidirectional stepping selector useful in connection with the invention.

Journalled about a vertical axis on the carriage is a gear 322, having a splined sliding connection to a spline shaft 324 also journalled in the top and bottom plates and arranged to be driven stepwise, clockwise or counter-clockwise, by a double ratchet wheel 326 engageable by one or the other of two dogs 328, 330 normally spring-urged out of contact with the ratchets. Either dog may be rotated, to move its ratchet section correspondingly, by respective magnets 332 and 334. These magnets can thus rotate gear 322, a step at a time, regardless of the vertical position of the carriage.

A set of gear segments 336 are loosely mounted for rotation about a fixed vertical shaft 338 held in the top and bottom plates, but are fixed as to their vertical positions as by suitable spacers therebetween. Each of the segments carries a contact wiper arm 340 rotatable over a bank of contacts 342 on a respective insulating board 344, these being mounted with vertical spacing corresponding to segments 336. Preferably, the boards 344 have their contacts and connections formed as printed circuits in any of several well known ways. External connections may be made as desired, to the contact boards, by plug or eyelet arrangements as also well known. Thus, there may be ten contact segments on each board wiped by a rotary wiper 340, and these ten segments may be wired to the respective control electrodes of a Nixie tube positioned adjacent the corresponding item name on one of the work station displays such as 46, 50 in FIGURE 2 of the drawings The return path from the common electrode of the Nixie tube through the voltage source will terminate at the common contact segment 345 which wiper 340 engages in all of its positions, When any item pertaining to that work station is ordered, the cross-bar switch 108 will put a potential on the single lead connected to the corresponding segment 314, and the carriage 306 will drive automatically to the vertical position so marked. Thereafter, the same conductor receives from pulse generator 112, of FIGURE 2, a number of pulses corresponding to the quantity of that item newly ordered. A lead 348 conducts these pulses from wiper 320 to magnet 332, which therefore steps the engaged wiper 340 a corresponding number of steps, and adds the number to the display of the Nixie tube connected to that wiper board.

Figure 10:
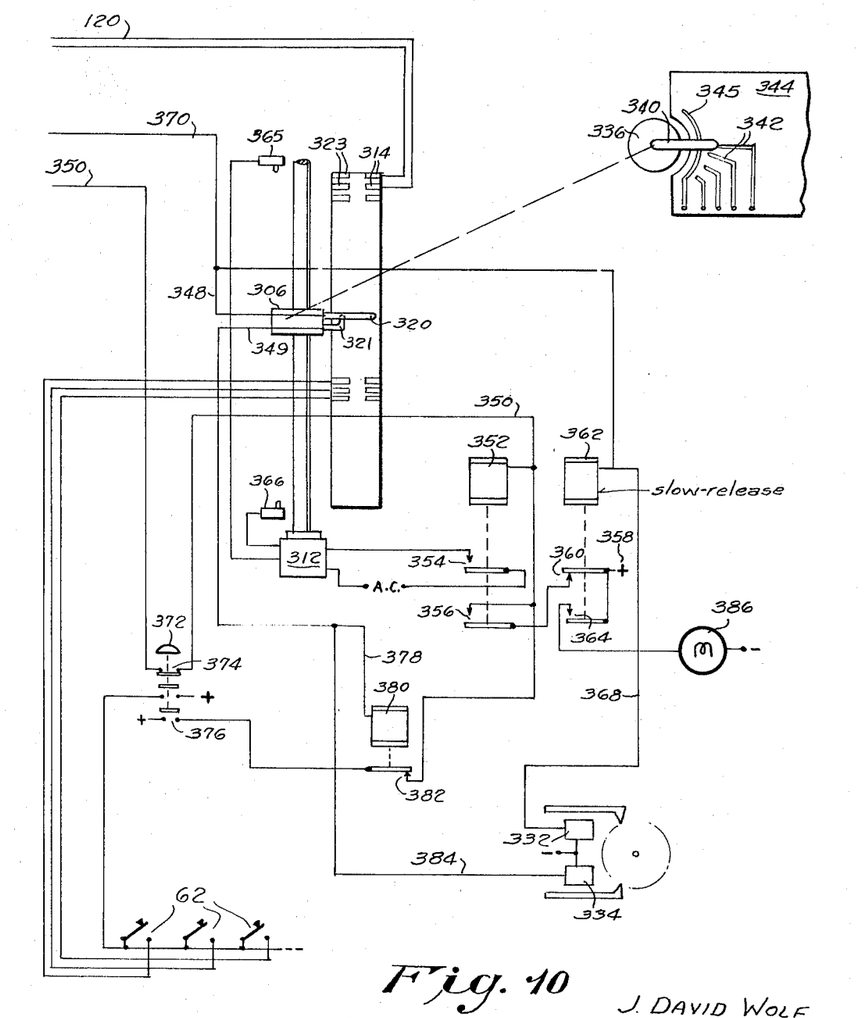
FIGURE 10 is a wiring schematic for the device of FIGURE 9.

While it would be possible to reduce the number of conductors from the cross-bar switch 108 which must extend to the order display boards, by the use of a known form of selector-connector link circuit, it is equally feasible to extend the actual conductors 120 from the cross-bar switch to the particular order display boards to which they appertain. This system is shown in the drawings, as it is also easier to follow for purposes of circuit description. FIGURE 10 of the drawings shows a typical wiring diagram for the operation of the switch 122 as described. Thus, incoming leads 120 from the cross-bar switch are terminated at the contact segments 314. A separate common conductor from the cross-bar switch, designated by numeral 350 (see FIGURE 2), receives a positive voltage whenever the last selection stage of the cross-bar switch operates, and operates a relay 352 whose contacts 354 complete the energizing circuit of motor 312. A contact 356 of the same relay completes a holding circuit to the positive potential source at 358 via the normally-closed contacts 360 of another relay 362; the coil of this second relay is connected by lead 348 to wiper 320. Accordingly, relay 352 remains operated until carriage 306 has put wiper 320 into contact with that segment 314 which is now receiving positive potential from the selected conductor 120; when that position has been reached, the resulting positive potential on wiper 320 operates relay 362, and motor 312 stops. Reversing switches 365, 366 are connected to the motor to reverse its travel direction when it reaches either extremity of the contact segment array.

Since relay 362 operates only when the carriage has arrived at the desired position, it is provided with another set of contacts 364 which will be described below in connection with the cancellation from the display board of orders which have been prepared or delivered. For the entry of a new order or orders for the selected item, however, it is sufficient to extend a conductor from lead 348 to the stepping magnet 332 of the switch; this conductor is indicated at 368. Magnet 332 will thus be energized as soon as carriage 306 arrives at the selected segment 314, and this potential is also applied over a conductor 370, extending to the pulse generator 112 of FIGURE 2, which thereupon momentarily interrupts the positive potential applied by the cross-bar switch to the selected lead 120, a number of times equal to the quantity desired of that item. These interruptions, which are perfectly analogous to dial pulses in an automatic telephone system, cause magnet 332 to rotate the selected wiper 340 of switch 122 a corresponding number of steps. Relay 362, of course, is made slow-to-release, so that these interruptions do not allow it to drop out and momentarily "jog" the motor 312. When the cross-bar switch finally disconnects, however, relay 362 will drop out and the system will be ready for a further selection.

Cancellation or reduction of the registered quantity of any item on the display board is effected in a similar manner. The operator first pushes switch button 372, whose normally-closed contacts 374 open the lead 350 to prevent the switch from receiving control signals from the cross-bar switch; the normally-open contacts are simultaneously closed to apply positive potential to one side of all of the pushbutton switches 62. Holding switch 372 depressed, the operator then operates the button 62 corresponding to the item he wishes to reduce in quantity; but in the meantime, the closing of a set of contacts 376 of switch 372 has operated relay 352 to start a homing operation of the switch 122. The closed switch 62 has placed positive voltage on the appropriate segment 323, and when the carriage has arrived at the specified level, this voltage is applied to wiper 321 and over conductor 378 to a relay 380 whose contacts 382 between contacts 376 of switch 372 and relay 352 open the circuit to the latter and cause the drive motor 312 to stop with wiper 321 on the segment 323 selected by button 62. A conductor 384 also extends the wiper voltage to the magnet 334, which immediately reduces the quantity indication of the selected wiper arm 340 by one unit. This signals to the operator that the proper quantity indicator has been reached, and if the desired count reduction was "one," the operator releases both buttons 62 and 372. If a greater count reduction is desired, he merely releases button 62 and re-operates it, as many times as he wishes, to effect any further count reduction. While holding button 372, the operator can then operate a different button 62 to repeat the cancellation or reduction process for any other items. Ultimate release of button 372 restores the switch to its normal state of connection for control from the cross-bar switch 108. Contacts 364 of relay 362 energize a signal lamp 386 to warn the operator against attempting a cancellation when the switch is being controlled by the cross-bar leads 120 from the central station.

*Alternate reversible indicator*

Figure 11:
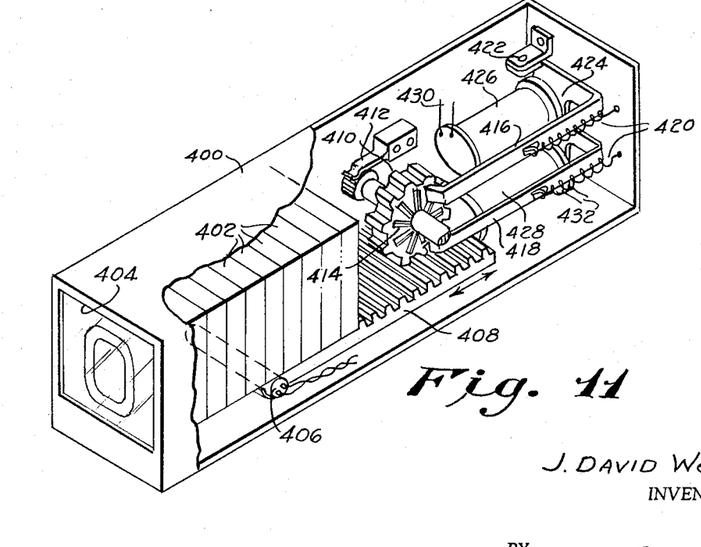
FIGURE 11 is a view in perspective, partly broken away, of a novel form of reversible luminous digit display indicator.

Since the foregoing operation involves some slight delay in causing the carriage 306 to seek out a particular marked line, an alternate form of reversible indicator, individual to each item on a given work-station display board, may be preferred in some installations. While the known Nixie tube will display any of ten digits, it cannot be stepped one digit at a time by the simple operation of a switch key. A luminous visual display which provides this facility is illustrated in FIGURE 11 of the drawings. Herein, an elongated rectangular casing 400 has mounted at its forward end a stack of polished transparent (glass or plastic) plates 402, each having deeply engraved in one surface a single digit. These plates are mounted in contact, and may be cemented or otherwise secured. The array is visible through a window 404 in the casing end, and at least the bottom edge (or another edge) of each plate is polished so as to transmit light readily upward through the plate, in the usual manner of edge-lighted plastic signs. In order to illuminate only a single selected digit, a miniature incandescent lamp, of tubular shape, and designated by numeral 406, is mounted at the forward end of a rack bar 408 slidably mounted in the casing. The rack bar projects rearwardly of the plastic plate assembly, and can be reciprocated, forward and back, by a gear 410 mounted on a horizontal axle. A detent 412 insures that the gear, and hence the rack, can only occupy stable positions in which a single plate at any one time will be illuminated for each lamp position. Light from the lamp thus enters the polished edge of only a single plate and is transmitted through the plate body to illumine the digit pattern by reflection and dispersion.

The side face of gear 410 has ten radial slots or grooves 414, or like formations, which are engageable by spring dogs 416, 418 to drive the gear in a selected direction. Thus, the dogs are normally held out of contact with the gear by springs 420, and are pivoted at their rear corners, as indicated at 422. Each dog has an armature portion as at 424, positioned near the pole of the corresponding electromagnet 426 or 428, so that when either magnet is energized, the corresponding dog engages the gear 410, on one side or the other of its rotational axis, to drive it one step in the desired direction. Thus, if magnet 426 operates to increase the displayed count, its conductors 430 will be connected to the negative terminal of the voltage source and to the appropriate item lead 120 (FIGURE 2) from the cross-bar switch, while the conductors 432 of magnet 428 will be connected to the potential source through the restoring button switch 62 of the display boards.

It will be obvious to those skilled in the art that by a very slight modification, a display device as shown in FIGURE 11 can be made to display a selected numeral, controlled by the number of pulses applied to the magnet 426, and to be held in that condition as by a pivoted pawl until the latter is retracted by the second magnet 432; whereupon the rack bar 408 is restored to zero indication by a spring constantly acting to move the bar in that direction. Such a modified indicator can readily be substituted for the other type by a suitable change in the operational procedure; namely, the provision that back-order indications for a particular item are to be cancelled to zero at appropriate times, rather than step-by-step.

*Out-of-stock indication*

The system as described, in which the ordering code separates the item-identifying portion from the quantity portion, makes it possible by very simple means to provide a special signal to the manager or supervisor when any particular item or items are selected; for example, any item which is temporarily out of stock. This is accomplished merely by disconnecting the corresponding output lead 120 from the cross-bar switch, and connecting in its place a conductor to a special signalling circuit.

Figure 12:
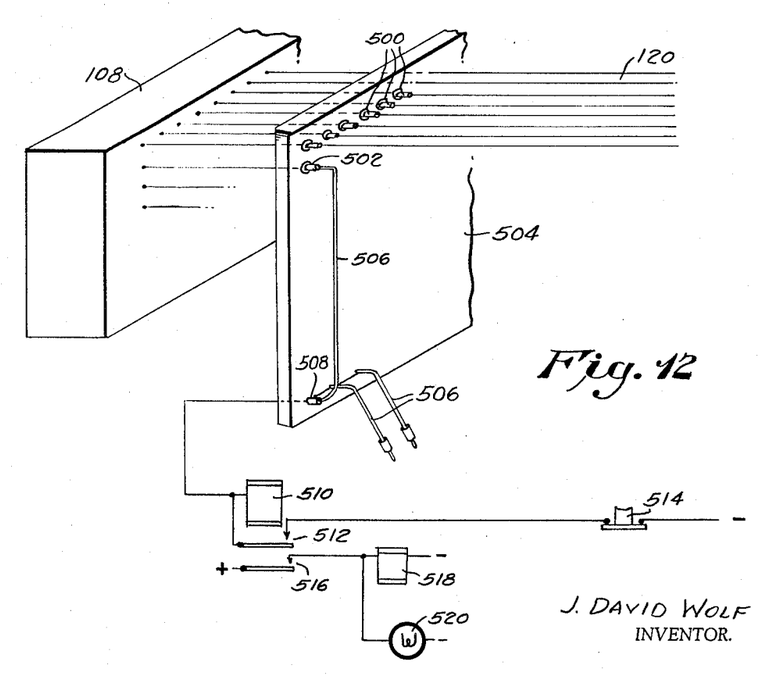

FIGURE 12 of the drawings illustrates such an arrangement, the cross-bar switch again being designated by numeral 108, and the output conductors leading ultimately to the back-order display boards (and to the control relays 116 of translator storage 40) by numeral 120. Each of the latter is connected to its corresponding terminal of the cross-bar switch by a simple single-conductor plug-and-jack connection. A typical plug such as an ordinary pin-type terminal tip is shown at 500, connected to one line 120, and its corresponding tip jack is numbered 502. All of the jacks are preferably mounted in orderly array on a cross-bar terminal panel 504, accessible for the changing of connections. The same panel provides a plurality of signal jumpers 506, also terminated in pin plugs or the like, suitable for mating with the panel jacks, and these jumpers are connected to a common signal circuit terminal 508. The terminal 508 is connected for example to a relay 510 which, when operated by the voltage appearing at any cross-bar terminal jack 502 which has been connected to thte signal circuit, establishes a holding circuit over its contacts 512 through a manually-operable release button switch 514. Other relay contacts 516 of the relay operate a signal such as a buzzer 518 and/or a lamp 520.

When an item is out-of-stock, or when for any reason the supervisor wishes to be advised when an item has been selected, he merely disconnects the corresponding output lead 120 at the panel board, and substitutes in its jack a jumper 506. When such item is thereafter selected, the signal is operated, and of course the item is also prevented from being displayed on any of the back-order display boards, and the translator storage 40 is not operated. Hence, while the selected item code will appear on the typed customer check 38, neither its clear text name or its unit price will be typed, and the supervisor can readily determine which item has been so intercepted, and can take appropriate action, such as a special notification to the waitress. Obviously, it will be prudent to remove any such forbidden items promptly from the menus in use, and the supervisor will be effectively reminded of any deficiency in this procedure, by the signal devices.

The invention has been disclosed herein in considerable detail, in order to comply with the patent statutes and to provide those skilled in the art with information needed to apply the novel principles, and to construct and use such specialized components as are required. However, it is to be understood that the invention can be carried out by specifically different equipments and devices, and that various modifications, both as to equipment details and operating procedures, can be effected without departing from the scope of the invention itself. The illustrative application of the invention as applied to a restaurant operation is also not intended to be restrictive, as the invention can equally well be applied to any mercantile situation in which steps of separate item routing, separate pricing, computing, and presentation of the back-order situation, can be effected automatically under control of an initiating operator on the one hand, and a production worker or workers on the other.

What is claimed is:

1. An electrical system for controlling the operation of a business, comprising a plurality of order stations, a central station connected for control selectively from any of said order stations, means at each of said order stations for generating coded messages corresponding to orders entered at said station, means for programming the operation of each order station to cause the transmission of the messages to the central station, a plurality of work stations at which are to be performed respective items of work called for by said messages, means at said central station for recording the messages as received, automatic means for computing numerical information based on the content of said messages, means for relaying selected portions of each of said messages to respective ones of said work stations, and means at each work station, responsive to the relayed message portions, for providing a visual display of order information pertinent to that work station.

2. An electrical system for controlling the operation of a business, comprising a plurality of order stations, a central station connected for control in turn from any of said order stations, means at each of said order stations for generating coded messages corresponding to the orders entered at said station, means for programming the operation of each order station to cause the transmission of the messages, in orderly fashion, to the central station, a plurality of work stations at which are to be performed respective items of work called for by said messages, means at said control station for recording the messages as received, and for computing numerical information based on the content of said messages, means for relaying selected portions of said messages to respective ones of said work stations, and means at each work station, responsive to the relayed message portions, for providing a visual display of order information pertinent to that work station.

3. An electrical system in accordance with claim 2, including storage means at each of said work stations for accumulating order information classified as to work categories and quantity, and manually operable means at each work station for selectively reducing the accumulated totals of work quantity as to respective work categories.

4. A system in accordance with claim 1, including means under the control of said central station apparatus for extending said channels to selected ones of a plurality of work stations, and individual work operation display equipment at each work station for displaying a clear text indication of the work operation information received over said extended circuits.

5. A system in accordance with claim 4, including register means at each work station for displaying the back-order quantities of received work operation code groups, and means at each work station for manually reducing the quantity displays in accordance with the completion of work operations of respective kinds.

6. A digital pulse remote signal control and computing system for mercantile operations, comprising work stations, at least one order station remote from said work stations, and a central station; remotely controllable digital-pulse order registering equipment at said central station; means connecting said order station to said equipment to register therein signals representing items of work to be performed; automatic means associated with said central station for translating said signals into a machine code and for appending thereto codes representative of the price of each work item; a calculator controlled by said automatic means for registering the items of work and their prices and for totaling the prices; apparatus at each work station for registering and displaying in text the items of work to be performed, as called for by said signals, and means associated with said central station for repeating said signals to said apparatus at selected work stations to control the display of such work items.

7. A remote control and computing system for mercantile operations comprising work stations, at least one order station, remote from said work stations, and a central station; remotely controllable order registering equipment at said central station; means connecting said order station to said equipment to register therein signals representing items of work to be performed; automatic means associated with said central station for translating said signals into a registrable code and for appending thereto codes representative of each work item; and a calculator control led by said automatic means for registering the items of work and price data individual thereto and for computing said data to provide an output total; apparatus at each work station for registering and intelligibly manifesting the items of work to be performed, as called for by said signals; and means associated with said central station for transferring portions of said signals selectively to respective work stations to control the manifestation thereof of such work items for processing at said stations.

8. A system according to claim 7 wherein said manifesting apparatus at the work station includes manual means for causing a decrease in the selecting work items from said quantity and said register apparatus includes means responsive to first said means for maintaining a current total of work items not yet completed.

9. A control and computing system for mercantile operations, comprising work stations, at least one order station remote from said work stations, and a central station; remotely controllable coded order registering equipment at said central stations; means connecting said order station to said registering equipment to register therein signals representing items of work to be performed; automatic means associated with said central station for translating said signals into a registrable code including data pertaining to the price of each work item; a calculator controlled by said automatic means for registering the items of work and the price data pertinent thereto and for computing a total thereof; apparatus at said work station for registering a sensible manifestation of the items of work to be performed, as called for by said signals; and means associated with said central station for transferring said signals from said central station to said apparatus at said selected work stations to control the sensible manifestation thereat of such work items.

10. A system according to claim 9 wherein said sensible manifestation in at least one said work station comprises a visible display registering the work item in clear text name and quantity ordered.

11. A system according to claim 9 wherein said sensible manifestation comprises a clear text print out of encoded information registered at said central station pertinent to the work at said work station.

12. A system according to claim 11 wherein said display includes means for subtracting work items from said sensible display to provide a residual total of unfilled work orders.

References Cited by the Examiner

UNITED STATES PATENTS

| | | | |
|---|---|---|---|
| 1,927,556 | 9/1933 | Nelson | 178—2 |
| 2,627,224 | 2/1953 | Wolf | 101—93 |
| 2,888,197 | 2/1959 | Winn | 235—92 |
| 3,102,256 | 8/1963 | Paul | 340—172.5 |
| 3,164,677 | 1/1965 | Morris et al. | 179—7.1 |

MAYNARD R. WILBUR, *Primary Examiner.*

JOHN F. MILLER, G. J. MAIER, *Assistant Examiners.*